United States Patent [19]

Quick, Jr. et al.

[11] Patent Number: 5,109,347
[45] Date of Patent: Apr. 28, 1992

[54] COMPUTERIZED VOLUMETRIC DISPENSING SYSTEM

[75] Inventors: Joe A. Quick, Jr., Midland; Arthur A. Kolka, Essexville; Donald E. Zahm, Midland; Howard C. Alexander, Sanford, all of Mich.

[73] Assignee: The Dow Chemical Company, Midland, Mich.

[21] Appl. No.: 310,751

[22] Filed: Feb. 7, 1989

[51] Int. Cl.⁵ .................................... G06F 15/20
[52] U.S. Cl. .................... 364/479; 222/134; 222/135; 436/179
[58] Field of Search .............. 364/500, 501, 502, 509, 364/510, 550, 479, 469, 496, 497; 436/179, 180, 50, 51; 435/3; 73/53; 222/14, 16, 26, 40, 53, 55, 57, 56, 61, 638, 394, 132, 135, 134

[56] References Cited

U.S. PATENT DOCUMENTS

| | | |
|---|---|---|
| 2,664,907 | 1/1954 | Lowe . |
| 2,715,610 | 8/1955 | Thompson . |
| 2,826,211 | 3/1958 | Reed . |
| 2,931,538 | 4/1960 | Young et al. . |
| 3,094,133 | 6/1963 | Treanor . |
| 3,094,135 | 6/1963 | Ponsar . |
| 3,135,277 | 6/1964 | Lupfer . |
| 3,217,883 | 11/1965 | Griswold . |
| 3,235,348 | 2/1966 | Witcher . |
| 3,256,902 | 6/1966 | Porter . |
| 3,272,217 | 9/1966 | Young . |
| 3,309,507 | 3/1967 | Schlein . |
| 3,376,883 | 4/1968 | Douty et al. . |
| 3,378,024 | 4/1968 | Kruik . |
| 3,379,202 | 4/1968 | Page . |
| 3,452,774 | 7/1969 | Stanton . |
| 3,475,392 | 10/1969 | McCoy et al. . |
| 3,595,268 | 7/1971 | Archer . |
| 3,642,171 | 2/1972 | Ernst . |
| 3,653,842 | 4/1972 | Putman . |
| 3,762,428 | 10/1973 | Beck et al. . |
| 3,770,198 | 11/1973 | Mihara . |
| 3,865,308 | 2/1975 | Pringle et al. . |
| 3,882,882 | 5/1975 | Preisig . |
| 3,894,690 | 7/1975 | Hill . |
| 3,913,606 | 10/1975 | Anderson, Jr. . |
| 4,007,755 | 2/1977 | Lerner et al. . |
| 4,019,653 | 4/1977 | Scherer et al. . |
| 4,036,062 | 7/1977 | Cruzan . |
| 4,092,993 | 6/1978 | Stevenson . |
| 4,119,110 | 10/1978 | Stone . |
| 4,183,384 | 1/1980 | Ervin et al. . |
| 4,186,769 | 2/1980 | Buyce . |
| 4,194,650 | 3/1980 | Nottke et al. . |
| 4,196,748 | 4/1980 | Gillespie . |
| 4,204,259 | 5/1980 | Tabe ..................................... 364/497 |
| 4,209,258 | 6/1980 | Oakes . |
| 4,228,815 | 10/1980 | Juffa et al. . |
| 4,246,969 | 1/1981 | McLoughlin et al. . |
| 4,265,266 | 5/1981 | Kierbow et al. . |
| 4,285,445 | 8/1981 | Vander Molen et al. . |
| 4,320,775 | 3/1982 | Stirling et al. . |
| 4,333,356 | 6/1982 | Bartels et al. ........................ 364/502 |
| 4,337,786 | 7/1982 | Myers et al. . |
| 4,341,107 | 7/1982 | Blair et al. . |
| 4,344,469 | 8/1982 | Brown . |
| 4,390,035 | 6/1983 | Hill ..................................... 222/135 |
| 4,392,508 | 7/1983 | Switall ............................... 222/132 |
| 4,427,133 | 1/1984 | Kierbow et al. .................... 222/135 |
| 4,440,314 | 4/1984 | Vetter et al. . |
| 4,547,128 | 10/1985 | Hayes ................................ 222/135 |
| 4,560,089 | 12/1985 | McMillin et al. ..................... 222/14 |
| 4,693,971 | 9/1987 | Misaki ................................. 435/28 |
| 4,719,574 | 1/1988 | Duback et al. ..................... 364/510 |
| 4,794,806 | 1/1989 | Nicoli et al. ........................ 436/179 |
| 4,837,157 | 6/1989 | Turnell et al. ...................... 436/179 |
| 4,876,653 | 10/1989 | McSpadden et al. ................ 222/135 |
| 4,976,137 | 12/1990 | Decker et al. .......................... 73/53 |
| 5,020,917 | 6/1991 | Homan ................................ 222/135 |

Primary Examiner—Jerry Smith
Assistant Examiner—Jim Trammell

[57] ABSTRACT

A computer controlled device for accurately mixing two or more fluid materials into a continual stream over an extremely wide range of relative quantities and fluid characteristics. The device can additionally sequentially dispense different predetermined mixtures of said fluid materials to two or more destinations. Mixing may be automatically accommodated in two or more sequential dilution steps. Provision exists for exact temperature control of the fluid materials and the discharge stream. Self monitoring and operation documentation are included. The device is designed to feed ingredients into continuous-flow processes which include testing of aquatic organisms for toxicological response to a variety of carefully controlled concentrations and combinations of chemical toxicants.

23 Claims, 3 Drawing Sheets

COMPUTERIZED VOLUMETRIC DISPENSING SYSTEM

MICROFICHE APPENDIX

This specification includes a microfiche appendix having one microfiche with twenty seven frames.

BACKGROUND OF THE INVENTION

The present invention generally relates to automatic volumetric dispensing systems, and particularly relates to a system and method for dispensing different volumes of a toxicant or other fluid test material to a plurality of vessels.

It will be readily appreciated that it is desirable to test or evaluate environmental effects of chemical toxicants and other test materials on marine or aquatic organisms. One of the principal methods that toxicologists use to predict the potential environmental effects of synthetic chemicals, such as toxicants, is the direct exposure of specimens of a selected test species to a graduated series of dosages of the particular chemical or other test material of interest. When the test species or organisms are from marine or aquatic environments, the test material dosages are typically applied as a graduated series of concentrations in water. These concentrations are ideally maintained at exactly the same levels in the test vessels containing the organisms throughout the duration of the test. To approach this exactitude of concentration, it is necessary to continually or periodically supply fresh, properly diluted quantities of the fluid or suspended test material to compensate for losses of this material in the vessels containing the organism specimens. These losses are due to such factors as volatilization, absorption, decomposition, biological uptake, and other similar removal processes.

Thus, it is necessary to replenish the supply of the toxicant or test material in the vessels in order to maintain a stable concentration of the test material in each of the vessels. Typically, this replenishment procedure involves a dispensing cycle in which each of the vessels is supplied with a fixed volume of a solution containing the test material, a dilution fluid (e.g., water), and sometimes a carrier liquid. Each vessel or group of vessels is given a different concentration of the test material in order to determine the effect of the test material on the organisms at these different concentration levels. The groups of vessels referred to previously, are duplicates in the context of standard scientific procedures. In this regard, it is generally desirable for the toxicologist to prepare a dose response curve which graphs the effect of the varying concentrations of the test material on the organisms. From this curve, the toxicologist can predict the concentration of the test material which will produce a median lethal dosd (LC 50) and a no observable effect level (NOEL) upon the organism being studied. Since the accuracy of the dose response curve is dependent upon the number of different concentrations for the test material being evaluated, it is generally desirable to provide a dispensing system which is capable of providing a multitude of different concentrations as required to produce an accurate and reliable curve. It is desirable that a single dispensing system be used because it eliminates the error which could be introduced if two or more dispensing systems were employed which were not exactly matched and calibrated in terms of thier operational characteristics.

Systems to accomplish this tedious dilution and supply function are generally known in the art as diluters. One of the most common diluter designs used by toxicologists is a gravity-fed system of reservoirs and siphons which is based upon the Mount and Brungs design disclosed around 1960. With this design, there is a practical limitation on the number of different concentrations that can be provided, because the proportional ratio of concentrations is set by the physical equipment, such as the size of the vessels. In this regard, the upper limit is generally considered to be ten different concentrations per diluter with a maximum ratio highest to lowest concentration of 10:1. Additionally, this diluter design exposes the toxicant to the atmosphere, since siphon action or gravity flow is used to cause the flow of the toxicant from one level of vessels to the next to produce the varying concentrations of the toxicant. As a result, test toxicants which are volatile and/or sensitive to air are often compromised. The design constraints of this type of diluter usually accentuate any tendency that toxicants may have to separate and settle or rise to the surface (e.g., emulsions). Additionally, due to the fact that only gravity pressure is being used, sufficient velocity is not generated to sweep the inner walls of the toxicant conveying tubes clean and thusly, significant toxin loss may occur due to inner wall accretion. In order to clean this kind of proportional diluter, it is almost always necessary to completely disassemble the system between tests.

Another significant limitation of the above described gravity-fed diluter design, as well as other proportional diluter designs, is the lack of the ability to independently set toxicant and dilution fluid volumes. In these designs, there is a direct proportional relationship between the volume of the toxicant and the volume of the dilution fluid in each of the vessels. These proportional relationships are fixed by the physical sizes of the vessels employed in the design. Accordingly, in order to change the range of concentrations employed for a test, it is necessary to change the physical hardware in the diluter system. Additionally, the only way to change the highest concentration is to change the stock solution concentration of the toxicant. Further, calibration and other fine adjustments to such proportional diluters involve physically moving siphon or drain tubes up and down in a trial and error procedure. Each adjustment requires one or more compensatory adjustment in other vessels feeding that particular concentration, a difficult and often inaccurate procedure at best.

Another known diluter design is referred to as a positive displacement diluter. Positive displacement diluters use positive displacement pumps to simultaneously measure and pump the toxicant and dilution fluid. The measurement is made by counting the number of strokes or revolutions for both the toxicant pump and the dilution fluid pump. However, this diluter design also has significant limitations, such as the need to lubricate the pump's pistons or rotors without contaminating the fluids being pumped. Other such limitations include the existence of a dead period in the lines between strokes of the pumps and the need for mechanical valves that can clog or leak backward thus altering the delivered volume. There are also mechanical limitations on the number of different concentrations. In this type of diluter design, it is very difficult to provide for a large number of concentrations while simultaneously providing acceptable accuracy for the study. Close mechanical tolerances are generally required, and this makes it difficult for the diluter to dispense test materials which have suspended particulates (e.g., abrasive materials). The required close tolerances and the complexity of these diluters often leads to maintenance problems which are unacceptable for tests which involve long-term chronic exposures of the test material to the organisms.

Additionally, even though positive displacement diluters are more versatile than proportional diluters, positive displacement designs are also quite limited in the range of test material concentrations that can be delivered, as these designs typically require mechanical changes to provide a concentration which is more than a factor of ten from another concentration level. It should also be noted that these systems generally cannot be fine tuned to adjust for minor deviations of individually delivered concentrations from the concentration levels required by the testing protocol.

One system that has not been used as a diluter but does have the capability of volumetrically combining various fluid streams is made by Technicon Instruments Corp. (35 Benedict Ave., Terrytown, N.Y. 10591) and is used primarily for automated chemical analysis. The system uses a bank of peristaltic pumps on a single shaft and varies the volume delivery by varying the bore size of the pump tubing. This greatly limits its range of delivery volumes and makes calibration of individual pumped streams virtually impossible. The system also suffers from the usual shortcomings of peristaltic pumps such as back flow of fluid, tubing fatigue and breakage, and delivery volume changes due to progressive changes in tubing geometry.

It is also worthy to note that the test materials which often attract the most scientific interest are those which have very low solubilities in water (e.g., typically less than one milligram per liter). Prior diluter designs, whether of the proportional or positive displacement types, are generally limited in their ability to mix the test material and dilution water in the precise quantities necessary to provide an accurate test for these very low solubility test materials. Also, all of the prior diluter systems were limited to a specific distribution sequence relative to the concentration levels to be placed within the vessels. That is, the prior systems distributed their substances in a sequence ranging from the highest to the lowest concentrations or vice versa. This linear sequence allows such non-experimental variables as toxicant supply tube length unavoidable longitudinal temperature gradients in the water bath containing the test vessels, and other large-scale conditions to affect test results. Such variation patterns could theoretically be statistically eliminated if test vessel concentrations could be randomized, thus greatly improving the data quality.

Accordingly, it is a principal object of the present invention to provide an automatic diluter system for dispensing different volumes of a fluid test material to a plurality of vessels which overcomes many of the limitations of prior diluter designs.

It is another object of the present invention to provide a diluter system in which the variations in concentration are no longer dependent upon mechanical constraints, but may be readily affected through computer software programming changes.

It is a further object of the present invention to provide a diluter system which is capable of handling a high number of different concentrations of the test material in a single test.

It is an additional object of the present invention to provide a diluter system which has the ability to independently set test material and dilution fluid volumes.

It is also an object of the present invention to provide a diluter system which has the ability to handle very low solubility toxicants, and the ability to handle volatile toxicants through the use of isolation from the atmosphere and short transfer times.

It is yet another object of the present invention to provide a diluter system which has the capability of randomizing the order in which the different concentration volumes are delivered to their respective test vessels during different tests in order to improve statistical parameters.

It is yet an additional object of the present invention to provide a diluter system which has a provision for automatically washing the pipelines after a test has been concluded to substantially decrease the turnaround time required between tests.

It is yet a further object of the present invention to provide a diluter system which has the ability to control the temperature of the fluids being conveyed to improve the reliability of test results.

It should be noted that most of the design objectives that this computerized diluter achieves are identical to the needs of several other fields and thus represent direct applications of this design. In general, continuous flow production and fabrication processes are inherently advantageous over batch processing methods but have not been achievable due to the unavailability of reliable continual-flow type ingredient mixing equipment, that is: volumetrically accurate over a wide range of flow rates; can handle many ingredients simultaneously; can dispense a wide range of mixture ratios including trace quantity ingredients; is easy to set up and adjust; is volumetrically stable; can handle viscous fluids, emulsions, foams and suspensions; provides temperature control; will be self monitoring and provide alarms and help requests; is self cleaning; can be programmed flexibly; and is constructed primarily of widely available components. All these and more are achievable with the computerized volumetric dispensing system of this invention. This system may be used in such applications as providing food ingredient mixtures to tube ovens and extrudes, feeding reactant charges to continuous flow chemical reators, or providing the mixture of monomers, colorants, antioxidants and other ingredients to plastic extrudes and sequential molding operations.

SUMMARY OF THE INVENTION

To achieve the foregoing objectives, the present invention provides a system for dispensing different volumes of a fluid test material to a plurality of locations, which includes, first conveying means for causing a quantity of the fluid or fluidized test material to flow from a source of this material, second conveying means for causing a quantity of a diluent to flow from a source of the diluent, and sensor means for generating signals indicative of the volumes of the fluids being conveyed. The diluter system also includes first valve means for combining the flow of the test material and the flow of the diluent into a series of individually determined combined flow volumes and, second valve means for directing each of the combined flow volumes to the locations in a predetermined physical sequence and a random concentration sequence. A computer controller is also provided for controlling the first and second conveying means and the first and second valve means in response to the signals from the sensor means, such that the individually determined combined flow volumes of the fluid material and the diluent are permitted to flow through the first valve means and be directed by the second valve means to each of the locations in the predetermined sequence. Thus, in accordance with the method of the present invention, separate streams of the test material and the diluent flow through volumetric measuring devices and then to a valve which combines these two volumes into a single stream. This combined stream then runs through another valve which sends the combined stream to the appropriate location or vessel containing the organisms which are the subject of the test. In one form of the present invention, the first valve means includes an electrically actuated valve connected to each of the first and second conveying means and fitting means for coupling the output of the two conveying means together into a common conduit which leads to the second valve means.

The present invention also features the use of multiple dilution stages and additional conveying means for permitting a carrier compound to be added to the combined flow volumes being dispensed to the vessels. As with the fluid test material and the diluent, the volume of the carrier can also be individually determined. This permits the cancelling of the carrier as an undesirable experimental variable, in that the same carrier volume may be added to each of the vessels independently of test material concentration in contrast to prior proportional designs in which carrier and toxicant delivery volumes are linked and both vary together.

Additional features of the present invention include the ability to dispense multiple test materials to a single vessel in independently determined volume and concentrations and the ability to dispense a carrier fluid with the test material in independently determined volumes. The diluter of the present invention also avoids contamination to the diluted test material in the vessels by the physical equipment used in the design. The diluter design also permits samples of the diluted test materials to be taken automatically for analytical confirmation of exposure concentrations. This diluter design also provides a substantial increase in volumetric accuracy (e.g., less than 1% error), as well as greater concentration and volume ranges in comparison with prior diluter designs. This diluter design also permits individual fine tuning adjustments to the dispensing cycles for each of the test vessels which may be readily implemented by the operator from the computer keyboard. The pressurized delivery of diluted test material in this diluter design also permits vertical arrays of test vessels to be used and allows for test vessel placement to be level with or even above the diluter equipment. This diluter design is also designed for automatic unattended operation for long periods due to a provision for self diagnosis and malfunction control.

Furthermore, it can change exposure regimens or even conclude one test, clean itself, and start a new test totally unattended while providing written documentation of function.

Additional advantages and features of the present invention will become apparent from a reading of the detailed description of the preferred embodiment which makes reference to the following set of drawings in which:

DETAILED DESCRIPTION OF THE PREFERRED EMBODIMENT

Figure 1:
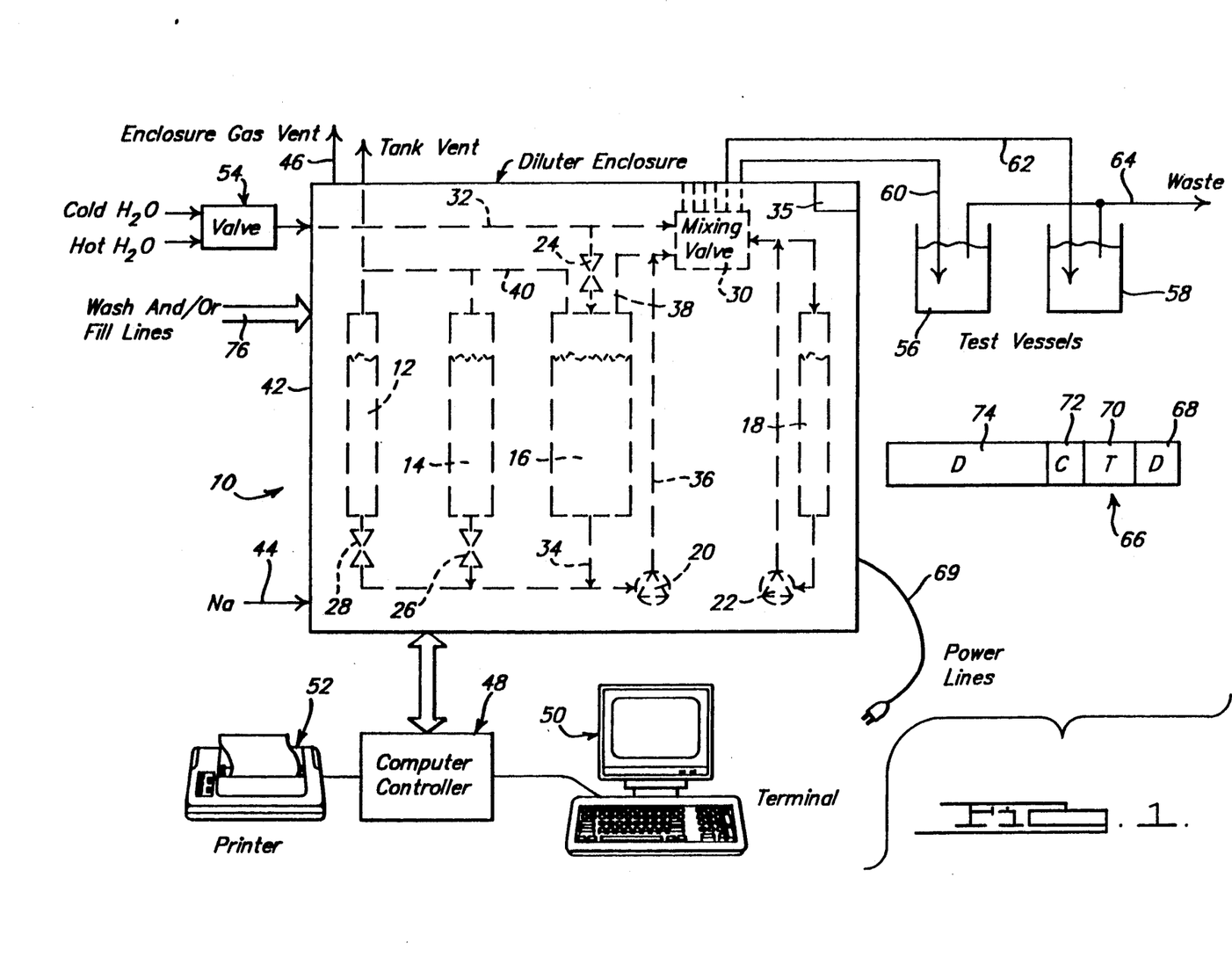
FIG. 1 is a simplified block diagram of a computerized diluter system in accordance with the present invention.

Referring to FIG. 1, a block diagram of a computerized volumetric dispensing system 10 in accordance with the present invention is shown. As will be more fully appreciated below, this block diagram has been simplified for illustration purposes. A more detailed discussion of each of the components in the dispensing system 10 will be presented in connection with FIG. 2.

In FIG. 1, the dispensing system 10 is shown to include four tanks 12, 14, 16, 18 for containing various fluids. In this particular embodiment, tank 12 or 14 is used to contain a fluid test material at some concentration. Similarly, the tank 16 is used to contain a diluted quantity of this fluid test material, and the tank 18 is used to contain a carrier fluid (primary diluent) for this test material. However, it should be appreciated that the tanks 12 and 14 could carry different fluid test materials, and the tank 18 could be used to carry a fluid test material instead of a carrier for the fluid test material.

It should be noted that the terms fluid test material, fluid material, and/or test material include any flowable material such as liquids, diluted liquids, liquid solutions, liquid suspensions (e.g., sol and gel emulsions and particle suspensions), and even gases (including suspension such as fumes or dusts) in the appropriate application. While the present invention is particularly advantageous in toxicological studies, where the fluid test material is a toxicant and the diluent is water, it should be appreciated that the present invention is also susceptible to other appropriate applications. Additionally, it should be understood that a diluter system according to the present invention can have a greater number or a fewer number of tanks than that shown in FIG. 1. Thus, for example, the carrier fluid tank 18 would not be necessary for fluid test materials which have the characteristic of being highly soluble in water. Likewise, the invention is capable of accommodating a large number of tanks of various materials to be combined and mixed in any combination and quantitative ratios.

The dispensing system 10 also includes a pair of pumps 20 and 22, valves 24-28, and a mixing valve assembly 30. The pump 20 is generally used to deliver fluid test material from the tanks 12 and/or 14 to the tank 16, to recirculate and mix the diluted fluid test material around the tank 16, and deliver this diluted fluid test material to the mixing valve 30. Similarly, the pump 22 is generally used to recirculate and mix the carrier fluid around the tank 18, and to deliver this carrier fluid to the mixing valve 30.

The valve 24 is generally used to control the flow of diluent water from the diluent supply conduit 32 to the tank 16. Thus, when it is desired to replenish the tank 16 with a quantity of diluent, the valve 24 is opened to permit the flow of diluent from the diluent supply conduit 32 into the tank 16. The valves 26 and 28 are used to control the flow of the fluid test material from the tanks 14 and 12 respectively to the inlet or low pressure side of the pump 20. As will be discussed below, nitrogen gas pressure is used to push liquid out of tanks 12 and 14. Thus, for example, when it is desired to replenish the tank 16 with fluid test material from the tank 12, the valve 28 will be opened while the pump 20 is operating. This will cause the fluid test material from the tank 12 to be injected into the pump 20 and mixed with fluid from the tank 16 via a recirculation loop which comprises conduits 34, 36, 38. Accordingly, the fluid from tank 14 will be added to the fluid from tank 16 (via conduit 34), and pumped through the conduits 36 and 38 which direct this fluid flow into the tank 16. By measuring the flow of fluid from line 32 through valves 30, 38 and the loss in volume of fluid from tank 12 or 14 through the valves 24, 28, 26, and controlling when these valves open and close, it should be appreciated that the tank 16 may be filled with a predetermined quantity of the fluid test material to achieve a precise desired fluid test material/diluent concentration ratio.

The pumps 20 and 22 are generally continuously run to maintain pressure in the conduits conveying the fluids to the mixing valve assembly 30. While a pump or other suitable conveying means could be provided to maintain pressure in the diluent supply conduit 32, such a provision is generally not needed when water is used as the diluent due to the existing pressure within conventional water lines. It should also be understood that the pumps 20 and 22 will provide continuous mixing of the fluids or solutions present in the tanks 16 and 18 via the recirculation loops to the tanks. As can be readily seen, the number of pumps may be increased as necessary to accommodate additional tanks and fluids to be combined.

Each of the tanks 12, 14, 16, 18 is provided with a suitable vent conduit, such as vent conduit 40, which permit exit or evacuation of the atmosphere (usually nitrogen) during the filling process.

It is worthy of noting at this point that all of the components of the diluter system 10 thus far described are contained within a cabinet-like enclosure 42 for regulating the surrounding temperature and atmosphere. As indicated by arrows 44 and 46, suitable gas inlet and outlet lines are preferably provided to control the atmosphere and pressure within the enclosure 42. The exiting gas line 46 is passed through a liquid bubbler to preserve the gas pad within the enclosure. Any appropriate gas, such as nitrogen, may be injected into the enclosure 42 for reasons including safety reasons. Thus, for example, if the fluid test material being studied is flammable and a malfunction occurs, the purging of the enclosure 42 with nitrogen will reduce the possibility of combustion. In this regard, it is also believed to be desirable to minimize the amount of circuits and electronics contained within the enclosure 42 and to use explosion resistant or explosion proof pumps and components.

A computer controller 48 is also shown to be disposed outside of the enclosure 42. The computer controller 48 is used to control the operation of the pumps 20–22; valves 24, 26, 28; and the mixing valve assembly 30. The controller 40 may be a micro computer having a minimum of 64K bytes of memory. The operating system allows for menu screening for operation of system 10. As will be seen in connection with FIG. 2, the computer controller 48 is responsive to signals generated by various sensors used in the dispensing system 10. A computer terminal 50 and a printer 52 are also provided to facilitate the operation of the dispensing system 10. The terminal 50 permits the operator to enter such information as the desired concentration ratios to be used, the identity of the diluent and other fluids to be employed, the time period of the test, the rate, frequency and destination for each concentration of the diluted fluid test material to be dispensed, and the temperature of the dispensed test material. In response to these input values, the computer controller 48 can be appropriately programmed to suggest the quantities of fluids needed to perform the test, to check to see if all of the valves and pumps are operational, to operate the dispenser system 10 throughout the test, to check for malfunctions occurring during the test, record and output operational parameters, provide security, and so forth. An example of such an "expert" computer program is set forth in a microfiche appendix which is hereby incorporated by reference.

It should be noted that the computer controller 48, the terminal 50, and the printer 52 may be comprised of any suitable or commercial components as desired. Thus, for example, the computer may be any conventional computer which has been designed for process control. Accordingly, the computer controller 48 should be equipped with the analog input/output and digital input/output cards necessary to process incoming data signals and transmit the output voltages necessary to control the various valves and pumps of the dispenser system 10. A pre-amplifier 35 may also be placed within enclosure 42 and is used to amplify some of the sensor signals in order that the computer controller 48 may process them accordingly. Additionally, as will be discussed more fully below, it is also necessary to employ the counter-timer circuit shown in FIG. 3. This circuit is used to process the fluid flow data from flow elements in the dispenser system 10.

FIG. 1 also shows a valve 54 disposed outside of the enclosure 42. The valve 54 receives both hot and cold water lines and is connected to the diluent supply conduit 32 within the enclosure 42. The valve 54 proportionally mixes the hot and cold water lines to provide a desired water temperature for the diluent supply conduit 32. It should be appreciated that the valve 54 could be disposed within the enclosure 42, and that other suitable ways of regulating the temperature of the diluent flowing within the diluent supply line 32 may be employed in the appropriate application (e.g., computer control).

The mixing valve assembly 30 operates to combine the flow of the diluted fluid test material from the tank 16 with the diluent from the conduit 32 and with the carrier fluid from the tank 18 into a single stream. This single stream comprises a series of individually determined flow volumes of these various fluids combined. The mixing valve assembly 30 then directs each of these combined flow volumes to the appropriate test vessel in a programmed physical sequence. It may thus be appreciated that the dosing sequence of test vessels and the concentration levels delivered to each may be independently programmed or randomized. In this regard, FIG. 1 shows two test vessels 56 and 58 which are connected to the mixing valve assembly 30 via supply conduits 60 and 62 respectively. While only two test vessels are shown, it will be readily appreciated that FIG. 1 is simplified for illustration purposes, and that the present invention is capable of dispensing different concentration ratios of the fluid test material in equal volumes of combined flow to many test vessels (e.g., 18). Each of the test vessels 56 and 58 is provided with a waste line 64 which permits the fluid within the test vessels 56, 58 to be maintained at a constant level. As discussed above, each of the test vessels may include one or many organisms which are the subject of the toxicological test.

FIG. 1 also schematically illustrates an exemplary combined flow volume 66 which is to be received by one of the test vessels 56, 58. For purposes of illustration, this combined flow volume is shown as if it were the plug flow of fluid exiting mixing valve 30 en route to test vessel 56 or 58 as directed. This particular combined flow volume generally comprises a first predetermined volume of diluent 68, followed by a predetermined volume 70 of the fluid test material, which is in turn followed by a predetermined volume 72 of the carrier fluid, and a second predetermined volume 74 of the diluent. An important feature of the present invention is that each of these portions 68-74 of the plug of fluid 66 being carried to the test vessel may be individually determined. Thus, for example, the diluent volume portion 74 for the test vessel 56 may be half the size of the same portion for the test vessel 58, while the other volume portions 68-72 remain constant for each of the test vessels. Each of these volume portions may be varied as desired by the operator without the requirement for any proportional relationship between any of these volumetric portions. Other variations, of course, are also readily achievable as well, such as the elimination of the toxicant volume portion 70 in the carrier control test vessel or of the carrier volume portion 72 when a highly soluble test material is used. Similarly, while it is desirable to have a volume of diluent before and after the fluid test material, either of the diluent volume portions 68 or 74 could be eliminated. The large volume portion 74 of diluent is preferably disposed at the rear of the combined flow volume or plug 66 to clear the conduits within the mixing valve assembly of any fluid test material residue which may be present. A blank of diluent may be discharged to waste between flow volumes to accomplish this purpose under some conditions (e.g., viscous toxicants).

FIG. 1 also shows a provision for wash and/or fill lines 76 leading to the enclosure 42. This is to illustrate a source of supply for the tanks 12, 14, and 18 which could be manually or automatically controlled to replenish the supply of fluids in these tanks. Additionally, these lines 76 also indicate that a detergent and/or other suitable cleaning solutions in combination or sequentially may be provided to these tanks and run through the dispensing system 10 to clean the system after a test is completed. Additionally, electrical power may be input into system 10 through power line 69.

Figure 2:
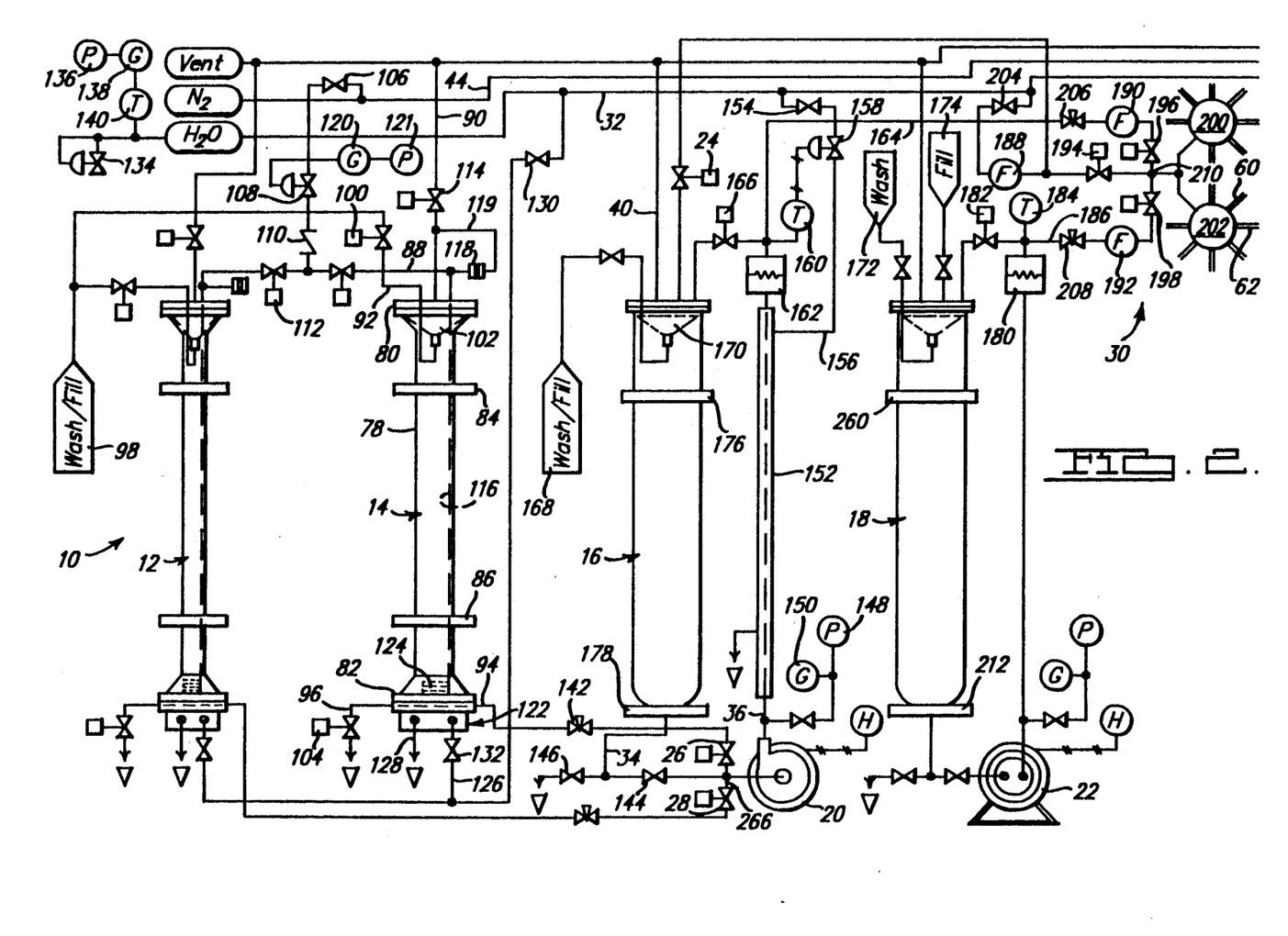
FIG. 2 is a schematic diagram of the computerized diluter system shown in FIG. 1.

Referring to FIG. 2, the schematic diagram of the dispensing system 10 is shown. It should first be noted that the same reference numerals in these figures are used to indicate identical components in these figures. Except that wash fill means 76 shown generally in FIG. 1 is shown in greater detail in FIG. 2 as being comprised of wash fill means 98, 168, 172, and 174. As shown in FIG. 2, the tanks 12 and 14 are generally constructed identically to each other, and the tanks 16 and 18 are generally constructed identical to each other. However, it should be appreciated that the sizes and construction of these tanks may be suitably varied in the appropriate application. In order to minimize the possibility of contamination, it is preferred that each of the tanks 12, 14, 16, 18 be provided with a Pyrex glass body, and components (i.e., end caps) comprised of 316 stainless steel alloy, Pyrex glass, or Teflon fluorocarbon polymer. It is also preferred that 316 stainless steel alloy be used for the various conduits, fittings, and valves in the dispensing system 10. Other suitable materials, such as Teflon (a DuPont trademark) fluorocarbon polymer, which are chemically resistant or inert to the fluids and other chemical entities with which they will come into contact may also be employed in the appropriate application. Similarly it is preferred that the pumps 20 and 22 be magnetically coupled to their respective impellers rather than shaft driven in order to minimize the chances of chemical activity or contamination. In one embodiment according to the present invention, pump 20 is an Eastern 2F-34C centrifugal pump, while pump 22 is a Tuthil gear pump.

Since the constructions for the tanks 12 and 14 are generally identical, the primary difference being diameter (and thus volume), only the construction for tank 14 will be described herein. The tank 14 includes a tubular body 78, and a pair of end caps 80 and 82. The end caps 80 and 82 may be secured to the tubular body 78 by any conventional means, (such as pressure clamps) and it is preferred that synthetic elastomer gaskets (such as silicone rubber or fluorocarbon elastomer) be provided to create a seal between the end caps 80, 82 and the tubular body 78 of the tank 14. A pair of support brackets 84 and 86 are also shown. These brackets are used to mount the tank 14 to the back wall of the enclosure 42 in a generally vertical position.

The tank 14 also includes a gas inlet conduit 88, a gas outlet conduit 90, a fluid inlet conduit 92, and a pair of fluid outlet conduits 94 and 96. The fluid inlet conduit 92 is connected to the wash/fill means 98 through the valve 100. The other end of the inlet fluid conduit 92 terminates in a spray nozzle 102 disposed within the tubular body 78 of the tank 14. In order to fill the tank 14 with a fluid test material, appropriate valves in the wash/fill means 98 are opened or closed and the valve 100 is opened to permit fluid flow through the conduit 92. Fluid flow from the conduit 92 is then sprayed into the top of the tubular body 78 of the tank 14 by nozzle 102, and the outlet gas line or vent line 90 with opened valve 114 permits the evacuation of the gas or atmosphere within the tank during this filling process.

While the spray nozzle 102 is not necessary for this filling process, it is useful when it is desired to wash out the tank 14 after the test has been completed. Thus, a suitable cleaning solution from the wash/fill means 98 may be sprayed into the tank 14 so that this cleaning solution runs down the sides of the tank and out through the fluid outlet conduit 96. The fluid outlet conduit 96 is a waste line for the tank 14 and is provided with a valve 104 for controlling fluid flow through this conduit. Both of the valves 100 and 104, as well as all of the other identically illustrated valves in the dispensing system 10, are electrically actuated solenoid valves which open and close under the control of the computer controller 48 shown in FIG. 1. It can readily be appreciated that other remotely controlled valves such as pneumatic valves may be substituted if operating parameters are met.

After the tank 14 is filled with a fluid test material, gas pressure from the gas inlet line 88 is used to force fluid test material from the tank 14 out through the fluid outlet conduit 94. Gas flow through the gas inlet conduit 88 is derived from the nitrogen supply conduit 44. The gas inlet conduit 88 is connected to the nitrogen supply conduit 44 through a manually actuated needle valve 106, a pressure regulator valve 108, a back flow preventing check vlave 110, and a solenoid valve 112. The manually actuated valve 106 is used to set a maximum flow rate, while the pressure regulator 108 is used to limit the gas pressure to the gas inlet conduit 88. The check valve 110 prevents a reverse flow of gas from the tank 14 to the nitrogen supply line 44, while the solenoid valve 112 controls the flow of gas from the nitrogen supply line 44 to the gas inlet conduit 88. Accordingly, when it is desired to force fluid test material from the tank 14, the solenoid valve 112 is opened, while another solenoid valve 114 disposed in the gas outlet or vent line 90 is closed. This will cause pressure to build up within the tank 14 and force fluid flow through the fluid outlet conduit 94.

In order to measure the volume of fluid flowing from the tank 14, a dip tube 116 is provided within the tank 14, and a pressure element 118 is connected to the gas inlet conduit 88. A reference pressure tube 119 is connected between the vent line 90 on the tank 14 side of valve 114 and the reference side of pressure element 118. The pressure element 118 generates a signal indicative of the pressure differential between the gas inlet conduit 88 and the vessel 14 pressure (as transmitted via tube 119) which is transmitted to the computer controller 48 during automatic operation. As nitrogen gas slowly bleeds down the dip tube 116 from the conduit 88, the liquid or fluid height within the tank 14 will slowly decrease. Since the pressure element 118 measures the back pressure produced by the height of the fluid in the tank 14, this pressure will change as the height of the fluid decreases. The computer controller 48 can then convert this measurement of differential pressure to a measure of fluid height and thus a measure of change in the fluid volume being caused in the tank. An additional pressure element 121 may be connected to the regulator valve 108 so that the computer controller 48 may also have an indication of the pressure at this point in the line. A pressure gauge 120 may also be connected to the regulator valve 108 so that a manually readable indication of the pressure at this point may be obtained.

It should be noted that the tank 14 is also provided with a magnetic mixing assembly 122 to provide continuous mixing of the fluid test material in the tank 14. The magnetic mixing assembly 122 is preferably water driven to minimize the amount of electrical use within the enclosure 42 for the reasons discussed above. The magnetic mixing assembly 122 includes a small Teflon-coated magnet 124 which is dropped into the bottom of the tank 14. This Teflon-coated magnet 124 is spun by a spinning magnet in the magnetic mixing assembly base. This magnet in the base is spun by water derived from the diluent supply conduit 32. Accordingly, a water inlet line 126 and a water outlet line 128 are provided to the base of the magnetic mixing assembly 122. Manually actuated valves 130 and/or 132 may be provided to facilitate maintenance and to control the rate of water flow respectively through the magnetic mixing assembly 122. Valve 132 could be replaced by a solenoid valve, if automatic computer control was desired.

It may also be worth noting at this point that the diluent supply line 32 is provided with a regulator valve 134, a pressure element 136, a pressure gauge 138, and a temperature element 140. The regulator valve 134 is used to limit the fluid pressure within the diluent supply conduit 32. The pressure element 136 is used to generate a pressure signal which is readable by the computer controller 48, while the pressure gauge 138 is used to provide a manually readable indication of this pressure. The temperature element 140 is used to generate a signal which is indicative of the temperature of the fluid flowing through the diluent supply conduit 32. This signal may be used by the computer controller 48 to actuate the valve 54 on FIG. 1 in order to control the temperature in this diluent supply line in embodiments where computer control of diluent temperature is exercised.

The fluid outlet conduit 94 from the tank 14 is connected to the solenoid valve 26 through a manual regulator valve 142. The solenoid valve 26 is connected to the solenoid valve 28 (which alternatively may allow input from tank 12) by a cross-shaped fitting 266 which also permits an inlet fluid connection from the conduit 34 and an outlet fluid connection to the pump 20. The outlet conduit 34 from the tank 16 is connected to the inlet side of the pump 20 through a manually actuated valve 144. A computer controlled solenoid valve is not needed at this point in the place of the valve 144 as it is preferred to continuously recirculate the diluted fluid test material in the tank 16 through the operation of the pump 20. It should also be noted that the tank 16 is provided with a manually actuated valve 146 which controls the flow of fluid from the tank 16 to a waste line.

The pressure at the outlet side of the pump 20 may be monitored by a pressure element 148 and a pressure gauge 150. It is important to note that the conduit 36 leading from the outlet side of the pump 20 is provided with a concentric tube counter current type heat exchanger 152. Temperature controlled water from the diluent supply line 32 flows into the top of the heat exchanger 152 and out through the bottom of this heat exchanger to waste. Accordingly, it will be appreciated that a multitude of temperature control devices could be used to replace heat exchanger 152. Such devices might include use of other constant temperature fluids such as air, Freon, oil, or special heat transfer liquids or mechanical methods such as resistance electrical heaters or thermocouples.

In addition to the provision for a manually adjustable valve 154, the conduit 156 leading to the heat exchanger 152 is provided with a proportional control valve 158. The proportional control valve 158 is operated by the computer controller 48 in response to a signal generated by a temperature element 160 which senses the temperature of the fluid flowing out from the conduit 36. Appropriate signal averaging and/or time delays can be applied electronically to the resulting temperature feedback loop by the computer to prevent cycling and temperature overshoots and undershoots.

The conduit 36 is also provided with a filter 162 which generally comprises a sintered stainless steel cartridge. The filter 162 is particularly advantageous when an emulsion is used as the fluid test material, as the filter will prevent any large globules from being passed to the conduit 164 which leads to the mixing valve assembly 30. In some applications, it is necessary to hydraulically harvest the captured toxicant from the filter 162 and return it to tank 16 to maintain concentration control. In such cases a surface capture type filter element such as a wedge-wire screen or absolute pore membrane is used in filter 162. A shunt with a manually set or pulsed electronic valve (not shown) is installed between the impingement or upstream side of filter 162 and the return line 38 to tank 16. In this way, material collected on filter 162 is returned to tank 16 for recycle.

A solenoid valve 166 is also provided in the conduit 38 leading back to the tank 16. The solenoid valve 166 is open during a recirculate mode in which the diluted fluid test material in the tank 16 is recirculated around the tank by the conduit loop comprising conduits 34, 36, and 38, and the pump 20. When it is desired to switch to a delivery mode, the solenoid valve 166 will be closed, thereby forcing the fluid flow in the conduit 36 through the conduit 164 to the mixing valve assembly 30. In some applications, it is desirable to place a mixing device in line 36, especially when emulsions are in use and agitation or cavitation can serve to reduce the size of the emulsion globules. Several mixing devices such as various static mixer designs, mechanical, or ultrasonic mixers may be employed.

The tank 16 also includes wash/fill means 168, which leads to the spray nozzle 170 within the tank 16. In slight contrast, tank 18 is provided with separate wash and fill means 172 and 174 respectively. This is to illustrate just one of the many possible variations to the dispenser system 10 which may be made in the appropriate application. Thus, for example, while the fluids from the tanks 12 and 14 are shown to be injected into the inlet side of the pump 20, the outlet conduits from these tanks could also be connected to the wash/fill means 168 of the tank 16 or other suitable inputs to the tank 16, thus allowing transfer by gas pressure or gravity without the need for pump 20 to provide this transfer function. Additionally, it should be appreciated that while gas pressure to the tanks 12 and 14 is the preferred mode of enabling fluid flow to tank 16, other suitable conveying means such as pumps and the like could be provided in the appropriate application. It should also be noted that tanks 16 and 18 are each provided with a pair of brackets (176, 178 and 260, 262 respectively) for mounting these tanks to the back wall of the enclosure 42.

As in the case of the tank 16, tank 18 is also provided with a recirculation loop which includes pump 22. A filter element 180 and a solenoid valve 182 are also provided in this recirculation loop for the same reasons as described for the filter element 162 and the solenoid valve 166 in the recirculation loop for the tank 16. A temperature sensing element 184 is also shown in the tank 18 recirculation loop. It should be appreciated that the recirculation loop for the tank 18 could be provided with a heat exchanger and a temperature control valve as in the case of the recirculation loop for the tank 16. In addition, mixing means and toxicant harvest shunt means may be provided in a like way as described for tank 16. One function of filters 162 and 180 is to prevent damaging or clogging particulates or globules from reaching the mixing valve assembly. The filtration on toxicant supply tanks such as tank 16 is also to insure that suspensions or emulsions reaching the test vessels 56 and 58 have very small particle sizes in order to avoid gravity separation and maximize emulsion stability in the test vessels.

Again, it is important to note that the pumps 20 and 22 are run continuously to maintain the fluid pressure in the conduit lines 164 and 186 leading from the tanks 16 and 18 respectively to the mixing valve assembly 30. Once the conduits are bled to remove any air in these lines, the continuous operation of the pumps 20 and 22 will prevent any dead volume from being present in the conduits 164 and 186.

The mixing valve assembly 30 is shown in FIG. 2 to generally comprise flow elements 188, 190, 192; solenoid valves 194, 196, 198; and rotary valves 200 and 202. Manually regulated valves 204, 206, 208 may also be provided to limit the rate of flow through the flow elements 188, 190, 192 so as to insure greatest accuracy by achieving flow rates closest to the design optimums for each flow element model. Individual flow elements may be changed to larger or smaller capacity models as required to accommodate individual test needs although the wide measurement range of these devices makes this unnecessary in the vast majority of cases. The flow elements 188, 190, 192 are used to generate the signals indicative of the individual volumes of fluid being conveyed to the mixing valve assembly 30. The volumetric flow signals from the flow elements 188, 190, 192 are transmitted to amplifier 35 which, in turn, sends the process signal to the computer controller 48 which will act to close the solenoid valves 194, 196, 198, as well as the open solenoid valves 166 and 182 and vice versa in response to these flow signals.

Figure 3:
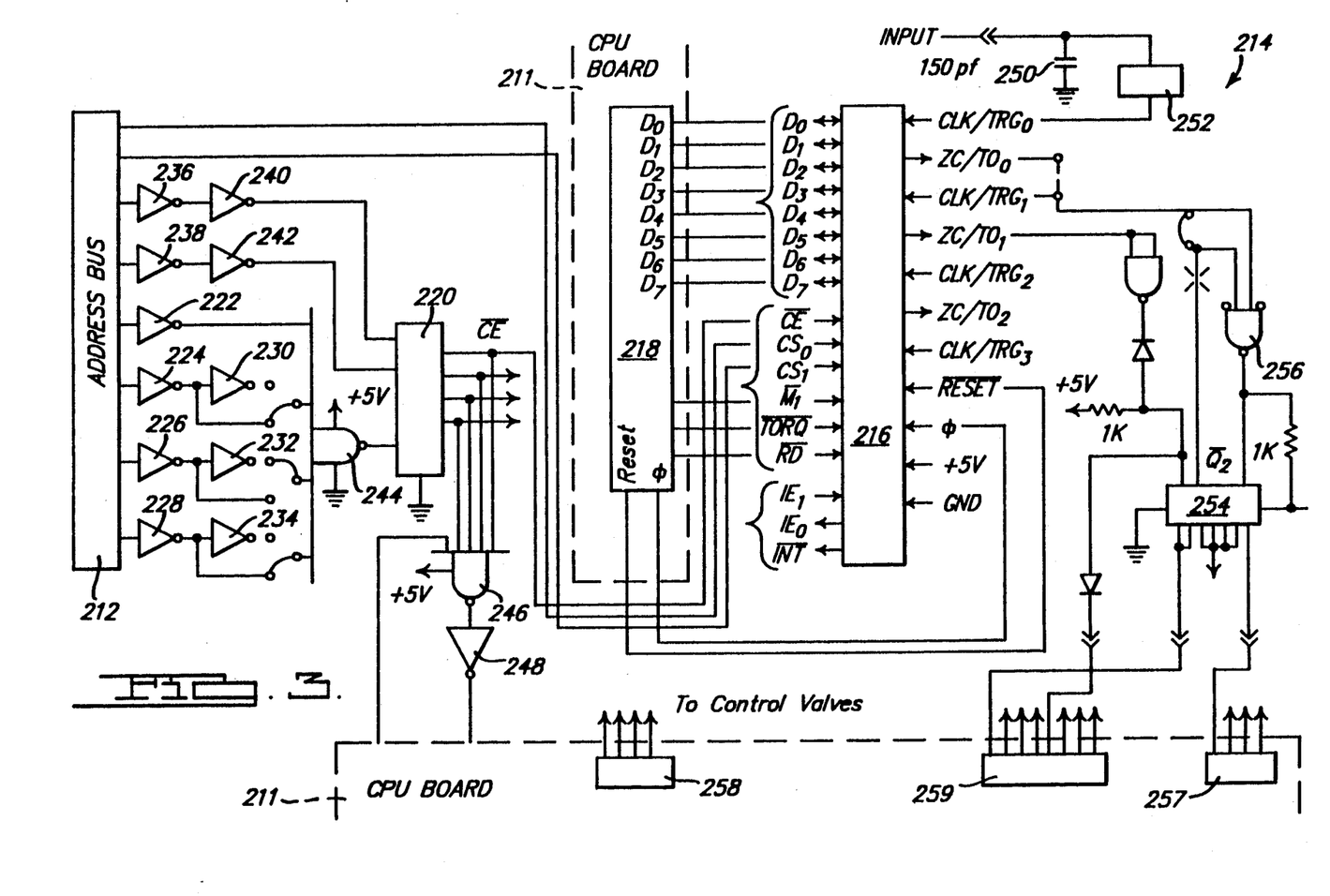
FIG. 3 is a schematic diagram for a counter-timer circuit contained in the computer controller.

To permit the computer controller 48 to process incoming data signals from the flow elements 188, 190, 192 in the dispensing system 10, the computer controller 48 has a CPU board 211, shown schematically in FIG. 3, which communicates with a counter-timer circuit 214. The counter-timer circuit 214 comprises a plurality of counter-timer integrated circuits 216 each controlled by a microprocessor 218 located on the CPU board 211. Each of the counter-timer integrated circuits 216 is used to process incoming signals from one of the flow elements 188, 190, 192 of the dispensing system 10. While only one of the counter-timer integrated circuits 216 is shown in FIG. 3, it will be understood that each flow element 188, 190, 192 has counter-timer integrated circuit 216 associated with it.

To selectively access each of the counter-timer integrated circuits 216, the counter-timer circuit 214 includes a BCD-to-decimal decoder 220 which communicates with the address bus 212 of the computer controller 48 through a plurality of inverters 222–242. This design incorporates an 8-bit byte size data format. It should be appreciated that any standard byte size greater than 8-bits could be utilized with appropriate changes in circuitry and components. The four most significant bits of the 8-bit address delivered by the address bus 212 are delivered to the inverters 222–228. The outputs of the inverters 222–228 drive a multiple input NAND gate 244 which communicates with one input of the BCD-to-decimal decoder 220. Similarly, the fifth and sixth most significant bits of the address from the address bus 212 are delivered to the BCD-to-decimal decoder 220 through the inverters 236–242. Each of the outputs from the BCD-to-decimal decoder 220 are delivered to respective enabling terminals of the counter-timer integrated circuits 216 thereby permitting the BCD-to-decimal decoder 220 to selectively enable the counter-timer integrated circuits 216. The seventh most significant bit and the least significant bit of the address are delivered to the $CS_1$ and the $CS_0$ inputs to the counter-timer integrated circuits 216 to allow selection of one of two channels of the counter-timer integrated circuits 216.

The outputs of the BCD-to-decimal decoder 220 further communicate with a NAND gate 246, the output of which is delivered to the CPU board through an inverter 248. The NAND gate 246 also receives an input from the CPU board 211, which is used to indicate an I/O read operation. The output of the NAND gate 246 is used to disable relatively noisy circuits during a read operation.

The counter-timer integrated circuit 216 is supplied through pins $D_0$–$D_7$ with a digital word (two eight bit bytes may be processed by separate counter-timer circuits to make up a 16 bit counter) from the microprocessor 218 which represents the amount of fluid which is to flow through a particular flow element associated with the particular counter-timer integrated circuit 216. The output from the respective flow element is delivered to the counter-timer integrated circuit 216 through the input line 264. A bypass capacitor 250 and a Schmitt trigger circuit 252 are placed within line 264 to generally suppress noise and improve signal quality. Specifically, the bypass capacitor 250 is used for noise filtering, while the Schmitt trigger circuit 252 is used to provide the hysteresis required to generate the appropriate input levels. When an enabling signal is received by the counter-timer integrated circuit 216 from the BCD-to-digital decoder 220, the counter-timer integrated circuit 216 begins counting pulses delivered by the Schmitt trigger circuit 252. Each time a pulse is received by the counter-timer integrated circuit 216, the original digital word delivered to the counter-timer integrated circuit 216 is decremented. When the original digital word is decremented to zero, a high going pulse is generated at the output at the $ZC/TO_0$ pin of the counter-timer integrated circuit 216. The high going pulse at the $ZC/TO_0$ pin is delivered to the CLEAR pin of a dual D flip-flop 254 through a NAND gate 256, which causes the OUTPUT of the D flip-flop 254 to produce a low going signal which, in turn, is delivered to a latch 257. In response, the latch 257 sends a signal to the microprocessor 218 which will indicate that it is time to close the valve that was previously opened to permit flow to one of the test vessels. Such control signals are sent via communication port 258. A latch 259 is also provided so that the microprocessor 218 can send the signals necessary to reset the flip-flop 254.

In one form of the present invention, each of the flow elements 188, 190, 192 comprise undershot paddle wheel type flow elements manufactured by Flow Technology, Inc. (Omni Flow Models FTO-N10-LJS, FTO-N10-LJS, and FTO-N1-LJS, respectively, with RF pickoffs and LFA-307-KLZ pickoff signal amplifiers). In this particular type of flow element, the metal paddle wheel veins of the flow element pass by a fixed electrode. The paddle wheel veins and the electrode form the two sides of a capacitor in an oscillator circuit. Accordingly, when a vein lines up with the electrode, the capacitance in the oscillator circuit increases so that the frequency drops momentarily. As the vein passes by the fixed electrode, the capacitance decreases again, thereby increasing the frequency of the oscillator circuit. This type of flow element approaches a linear response over a relatively wide range of speeds, but the response becomes nonlinear above and below certain volumetric flow rates. Accordingly, as mentioned above the manual throttling valves 204, 206, 208 are used to control the flow rate possible through the flow elements 188, 190, 192, so that these flow elements remain in the most accurate portion of the range. The calibration curve for each flow element is pre-programmed into computer controller 48 so that automatic compensation for nonlinearity in response is provided for, before counts are delivered to the counter-timer circuit 216.

It will, of course, be appreciated that flow can be measured in numerous ways, such as orifice plates, pilot tubes, acoustic flow meters, heated wire flow meters, and the like. Additionally, the nonlinear aspects of the flow meter response can be electronically compensated for in the computer controller 48 by using pre-programmed calibration curves. Thus, while it is preferred that paddle wheel type flow meters that produce minimal paddle wheel drag due to the sensing method be used for the diluter system 10, other suitable volumetric flow meters may be utilized in the appropriate application.

The output ports of the solenoid valves 194, 196, 198 are each closely connected to a cross-shaped stainless steel fitting 210 in order to minimize the conduit volume leading to the rotary valves 200 and 202. The rotary valves 200 and 202 are responsive to command signals from the computer controller 48 to direct the flow of fluid from the fitting 210 to the appropriate test vessel (e.g., vessel 56 or 58). The solenoid valves 194, 196, 198 are preferably fast acting valves which can open and close in a short period of time. In one form of the present invention, the solenoid valves 194, 196, 198 comprise a Model 203-1214-421 valve manufactured by Galteck Corporation, while the rotary valves 200-202 comprise a Model ELSD-10-HPT custom valve with electric activator and position feedback manufactured by Valco. While only two rotary valves connected in parallel are shown in FIG. 2, it should be appreciated that this number may be increased or decreased in the appropriate application and connected in staggered series/parallel as needed. Additionally, the rotary valves 200-202 could be replaced by other suitable valve means which is capable of directing the stream of combined flow volumes to each of the test vessels used for the study.

In operation, rotary valves 200, 202 are positioned to direct output to the desired test vessel, then the dilution fluid valve 194 preferably opens first, and diluent thereby flows past the flow element 188 until a predetermined volume is reached. The dilution valve 194 then closes quickly. Then, either simultaneously with the opening of the dilution valve 194 or subsequent to the opening of this valve, the fluid test material recirculation valve 166 will be closed and, as valve 194 closes, valve 196 will be opened to permit a predetermined volume of fluid to flow past the flow element 190 and into the fitting 210. After this predetermined volume of fluid test material has been reached, the valve 196 will also quickly close. Similarly, the carrier valve 198 will be opened to permit any carrier fluid to flow past the flow element 192 and into the fitting 210. When the predetermined volume of carrier fluid has been reached, the valve 198 will then be quickly closed. An additional volume of diluent is typically added last as described above to rinse the lines as discussed in connection with the combined flow volume 66 diagrammed in FIG. 1.

The fitting 210 combines these fluid flows into a single stream which is then directed to the appropriate test vessel by the position of one of the rotary valves 200-202. The other rotary valve would be effectively turned off by being positioned between ports or at a closed port. This procedure may be continuously or periodically repeated to create a series of individually or randomly determined combined flow volumes which will be directed to the test vessels in a predetermined sequence set by the program for the computer controller 48.

One of the significant advantages of the present invention is that the size, concentration, and make-up of the combined flow volume may be readily modified by changing the variable values in the computer software programming, instead of requiring physical hardware changes in the system. Thus, it should be appreciated that the fluid volumes are controlled by the time at which the valves 194, 196, 198 are opened, and the sequence at which these valves open and the time in which these valves are permitted to remain open all of which are solely dependent upon the computer program for the computer controller 48. Similarly, it is also possible to change the order in which the test vessels will receive fluid from the mixing valve assembly 30 from one test to another by a computer program variable change which alters the operation of the rotary valves 200-202.

Flow element 188 also serves to volumetrically add diluent fluid from line 32 through manual throttling valve 204 and electric valve 24 into tank 16. During dosing of test vessels, the computer program can monitor the volume of toxicant in tank 16 by adding the portions delivered to the test vessels. When the volume in tank 16 has been decremented by a preset amount, the dosing sequence is temporarily interrupted. Appropriate volumes of toxicant stock from tanks 12 and/or 14 are then volumetrically added to tank 16 as described above along with a measured volume of diluent. This diluent is added by holding valve 194 closed and opening valve 24 until the proper volume has passed flow element 188. Valve 24 is then closed. A preset time is then passed to achieve complete mixing and temperature equilibrium through the action of the pumped loops 34, 36, 38. Normal closing operation is thus resumed. It can be appreciated that this procedure can be accomplished without interrupting the normal dosing sequence if needed. Valve 24 is simply opened during the periods when valve 194 is closed as part of the normal dosing cycle. Done repeatedly and coordinated with input from tanks 12 or 14, tank 16 can be maintained at any desired level.

As each flow element 188, 190, 192 operates, the computer program can monitor not only the number of paddle wheel rotations but also the speed. This speed can then be compared with the pre-programmed calibration curve for the appropriate flow element to determine the actual volume delivered. This delivered volume can be compared with the desired volume and any difference used to appropriately adjust the number of counts delivered to the counter-timer circuit 216 to compensate in the next delivery through that particular flow element to that particular test vessel. Discrepancies may be averaged over several delivery cycles to prevent overshoots and thus produce an iterative procedure to achieve exactly the desired volumetric delivery to each test vessel 56, 58 through each flow element 188, 190, 192. This process allows any over volume or under volume deliveries to be compensated for over two to six cycles to any particular test vessel. The larger volume of the test vessel then serves to average out the pulses to achieve the desired test organism exposure concentration.

For environmental toxicology testing, as in many other operations, it is important to monitor and document equipment operation. The computerized diluter system contains many sensor elements and handshake loops that allow such monitoring. The computer program can collect and store this data, mathematically process data points and sets, compare operating parameters with preset norms, output the data as formatted paper copy or other medium, actuate alarms or other action-demanding devices as necessary, and even summon assistance via telephone dial-up and synthesized voice describing the problem or need. One important feature of this capability is that both remaining volume and rate of use for tanks 12, 14, 16, 18 can be monitored and processed to predict and announce when any manual filling assistance may be needed.

It should be appreciated from this design that great versatility exists for increasing the number of ingredients to be dosed, increasing the number of dilution steps for any or all ingredients, increasing the magnitude of difference between delivered volumes of various ingredients, or increasing the number of vessels to which mixtures are delivered. The number of ingredients is increased by adding modules consisting of a tank, pump, recirculation loop, and flow element such as the one composed of 16, 176, 178, 34, 144, 266, 20, 150, 148, 36, 152, 162, 166, 38, 164, 206, 190, 196. The number of dilution steps is increased by inserting additional mixing tank modules such as one composed of 94, 142, 26, 266, 20, 150, 148, 36, 152, 162, 166, 38, 16, 24, 188, 204 between primary ingredient supply tanks 12, 14 and the final dilution tank 16. The magnitude of difference between delivered volumes of ingredients can be changed by changing the capacity of all of the delivery/measurement lines such as the sequence of 22, 180, 182, 184, 186, 208, 192, 198. The number of delivery streams can be decreased by increasing the number of ports in rotary valves 200 and/or 202, adding more rotary valves, or increasing the valves on other types of distribution manifolds. The void volume and internal geometry of the communication 210 between the pulse length controlling valves 194, 196, 198 and the rotary valves 200, 202 influences the delivery accuracy of the diluter system 10 and thus must be designed and machined carefully to achieve extreme accuracy with very large number of discharge vessels.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A system for dispensing different volumes of a fluid material to a plurality of locations, comprising:

first conveying means for causing a quantity of fluid material to flow from a source of said fluid material and for continuously maintaining said fluid material under positive pressure;

first sensor means for generating a signal indicative of the volume of said fluid material being conveyed;

second conveying means for causing a quantity of a diluent to flow from a source of said diluent and for continuously maintaining said fluid material under positive pressure;

second sensor means for generating a signal indicative of the volume of said diluent being conveyed;

first valve means for sequentially combining the flow of said fluid material with the flow of said diluent into a series of individually determined combined flow volume;

second valve means for directing each of said combined flow volumes to said locations in a predetermined sequence, and controller means, responsive to said signals from said first and second sensor means, for controlling said first and second conveying means and said first and second valve means, such that individually determined flow volumes of said fluid material and said diluent are permitted to combine and flow through said first valve means and be directed by said second valve means to each one of said locations in said predetermined sequence.

2. The system according to claim 1, wherein said first conveying means includes first container means of storing fluid material received from said source of said fluid material, and pump means for forcing a quantity of said fluid material to be conveyed under positive pressure to said first sensor means from said first container means.

3. The system according to claim 2, wherein said first conveying means further includes loop means coupled to said pump means for enabling continuous recirculation of said fluid material around said first container means via said pump menas, and for maintaining positive pressure in the conduit portion of said first conveying means connected to said first sensor means.

4. The system according to claim 1, wherein said first valve means includes an electrically actuated valve connected to each of said first and second sensor means, and fitting means for coupling the output ports of said two valves together into a common conduit leading to said second valve means.

5. The system according to claim 4, wherein said second valve means includes at least one electrically controlled rotary valve.

6. The system according to claim 1, wherein said second conveying means includes means for controlling the temperature of the fluid material flowing through said first conveying means and the diluent flowing through said second conveying means.

7. A system for diluting and dispensing different volumes of a fluid material to a plurality of locations, comprising:

first container means for storing a quantity of a fluid material;

second container means for storing a quantity of diluted fluid material;

first conveying means for enabling said second container means to be replenished with said fluid material from said first container means;

second conveying means for enabling a quantity of a diluent to flow to said second container means from a source of said diluent in order to replenish said second container means with said diluent, and thereby dilute said fluid material from said first container means by a predetermined amount;

third conveying means for causing a quantity of diluted fluid material to flow from said second container means;

fourth conveying means for causing a quantity of diluent to flow from said diluent source;

sensor means associated with each of said conveying means for generating signals indicative of the volume of the fluids being conveyed;

first valve means for combining the flow of said diluted fluid material through said third conveying means with the flow of said diluent through said fourth conveying means into a series of individually determined combined flow volumes;

second valve means for directing each of said combined flow volumes to said locations in a predetermined sequence; and controller means, responsive to said signals from said sensor means, for controlling each of said conveying means and said first and second valve means, such that individually determined combined flow volumes of said diluted fluid material and said diluent are permitted to flow through said first valve means and be directed by said second valve means to each one of said locations in said predetermined sequence.

8. The system according to claim 7, wherein said third conveying means includes a conduit loop and a pump connected in said conduit loop to provide recirculation of said diluted fluid material around said second container means.

9. The system according to claim 8, wherein said first conveying means is connected to said second conveying means such that said fluid material from said first container means is injected into the low pressure side of said pump.

10. The system according to claim 7, wherein at least one of said combined flow volumes comprises an initial volume of said diluent, a volume of said diluted fluid material, and a subsequent volume of said diluent.

11. The system according to claim 7, further including washing supply means for cleaning said first and second container means, said first and third conveying means, and said first and second valve means.

12. The system according to claim 11, wherein said washing supply means includes fifth conveying means for causing a quantity of one or more cleaning solutions to wash down said first and second container means, through said first and third conveying means and through said first and second valve means in sequence or combination in response to command signals from said controller.

13. The system according to claim 7, wherein said first container means includes magnetic means for providing mixing of said fluid material within said container means.

14. The system according to claim 7, wherein said first conveying means includes gas pressure means for causing a quantity of said fluid material to flow under pressure from said first container means to said second container means, and third valve means for controlling this flow of fluid material.

15. The system according to claim 14, further including second sensor means associated with said gas opressure means for generating a signal indicative of the quantity of said fluid material in said first container means.

16. The system according to claim 7, wherein said third conveying means includes in-line filter means for controlling the particle size fo siad diluted fluid material flowing to said first valve means.

17. The system according to claim 7, wherein a temperature control means controls the temperature of said diluent and said diluted fluid entering said first valve means to maintain a predetermined temperature in the discharge from said second valve means.

18. The system according to claim 7, further including cabinet means for housing said first and second container means, all of said conveying means, said sensor means, and said first and second valve means, said cabinet means including gas flow means for purging the inside of said cabinet means with a predetermined gas.

19. The system according to claim 7, wherein said fluid material is a toxicant, and said diluent is water.

20. A system for diluting and dispensing different volumes of two fluid materials to a plurality of locations, comprising:

first container means for storing a quantity of a first fluid material;

second container means for storing a quantity of diluted first fluid material;

first conveying means for enabling said second container means to be replenished with said first fluid material from said first container means;

second conveying means for enabling a quantity of a diluent to flow to said second container means from a source of said diluent in roder to replenish said second container means with said diluent, and thereby dilute said first fluid material from said first container means by a predetermined amount;

third conveying means for causing a quantity of diluted first fluid material to flow from said second container means;

fourth conveying means for causing a quantity of diluent to flow from said diluent source;

third container means for storing a quantity of a second fluid material;

fifth conveying means for causing a quantity of said second fluid material to flow from said third container means;

sensor means associated with each of said conveying means for generating signals indicative of the volume of the fluids being conveyed;

first valve means for combining the flow of said diluted first fluid material through said third conveying means with the flow of said diluent through said fourth conveying means and with the flow of said second fluid material through said fifth conveying means into a series of individually determined combine flow volumes;

second valve means for directing each of said combined flow volumes to said locations in a predetermined sequence; and controller means, responsive to said signals from said sensor means, for controlling each of said conveying means and said first and second valve means, such that individually determined combined flow volumes of said diluted first fluid material, said diluent and said second fluid material are permitted to combine and flow through said first valve means and be directed by said second valve means to each one of said locations in said predetermined sequence.

21. The system according to claim 20, wherein said first fluid material is a toxicant, and said second fluid material is a carrier for said toxicant.

22. The system according to claim 20, wherein both of said fluid materials are toxicants.

23. A method of dispensing different volumes of a fluid material to a plurality of locations, conprising the steps of:

causing a quantity of fluid material to flow from a source of said fluid material;

generating a signal indicative of the volume of said fluid material being conveyed;

causing a quantity of a diluent to flow from a source of said diluent;

generating a signal indicative of the volume of said diluent being conveyed;

sequentially combining the flow of said fluid material with the flow of said diluent into a series of individually determined combined flow volumes in response to said signals indicative of the volumes of said fluids being conveyed; and directing eeach of said combined flow volumes to said locations in a predetermined sequence.

* * * * *

UNITED STATES PATENT AND TRADEMARK OFFICE
CERTIFICATE OF CORRECTION

PATENT NO. : 5,109,347

DATED : Apr. 28, 1992

INVENTOR(S) : Arthur A. Kolka, Donald E. Zahm, Joe A. Quick, Jr. Howard C. Alexander It is certified that error appears in the above-identified patent and that said Letters Patent is hereby corrected as shown below:

On the cover page, in the list of inventors, please list the inventors in the following order --Arthur A. Kolka, Essexville; Donald E. Zahm, Midland; Joe A. Quick, Jr., Midland; Howard C. Alexander, Sanford--.

Col. 18: Claim 1, line 50, cancel "fluid material" and insert --diluent--.

Col. 19: Claim 2, line 14, cancel "of" and insert --for--; Claim 3, line 23, cancel "menas" and insert --means--.

Col. 20: Claim 15, line 50, cancel "opressure" and insert --pressure--.

Col. 20, Claim 16, line 56, cancel "fo siad" and insert --of said--.

Col. 21, Claim 20, line 16, cancel "roder" and insert --order--.

UNITED STATES PATENT AND TRADEMARK OFFICE
CERTIFICATE OF CORRECTION

PATENT NO. : 5,109,347
DATED : Apr. 28, 1992
INVENTOR(S) : Arthur A. Kolka, Donald E. Zahm, Joe A. Quick, Jr.

It is certified that error appears in the above-indentified patent and that said Letters Patent is hereby corrected as shown below:

Col. 22, Claim 23, line 22, cancel "conprising" and insert --comprising--; line 25, after "fluid material" insert --and continuosly maintaining said fluid material under positive pressure--; line 29, after "said diluent" insert --and continuously maintaining said diluent under positive pressure--; line 37, cancel "eeach" and insert --each--.

Signed and Sealed this

Fifteenth Day of March, 1994

Attest:

BRUCE LEHMAN

Attesting Officer        Commissioner of Patents and Trademarks